US012691801B2

(12) United States Patent (10) Patent No.: US 12,691,801 B2

Jacobs et al. (45) Date of Patent: Jul. 28, 2026

(54) METHOD AND APPARATUS FOR OPERATING A MULTI-POSITION VEHICLE SEAT AND RESTRAINING AN OCCUPANT OF SUCH SEAT

(71) Applicant: Atieva, Inc., Newark, CA (US)

(72) Inventors: Michael Davis Jacobs, Redwood City, CA (US); Eric Magnus Bach, Newark, CA (US); Peter Dore Rawlinson, Foster City, CA (US)

(73) Assignee: Atieva, Inc., Newark, CA (US)

( * ) Notice: Subject to any disclaimer, the term of this patent is extended or adjusted under 35 U.S.C. 154(b) by 315 days.

(21) Appl. No.: 18/341,579

(22) Filed: Jun. 26, 2023

(65) Prior Publication Data

US 2024/0351491 A1 Oct. 24, 2024

Related U.S. Application Data

(60) Provisional application No. 63/497,381, filed on Apr. 20, 2023.

(51) Int. Cl.
B60N 2/42 (2006.01)
B60N 2/005 (2006.01)
(Continued)

(52) U.S. Cl.
CPC ......... B60N 2/42745 (2013.01); B60N 2/005 (2013.01); B60N 2/20 (2013.01);
(Continued)

(58) Field of Classification Search
CPC .. B60N 2/42745; B60N 2/4228; B60N 2/433; B60N 2/42772; B60N 2/42781; B60N 2/4279
See application file for complete search history.

(56) References Cited

U.S. PATENT DOCUMENTS 3,929,349 A 12/1975 Schubert
5,370,446 A 12/1994 Bancod
(Continued)

FOREIGN PATENT DOCUMENTS

CN 103991394 B * 8/2016
GB 2426189 A 11/2006
(Continued)

OTHER PUBLICATIONS

Lucid Motors: "Exploring Air," YouTube video available at https://www.youtube.com/watch?v=zKWTjlBksqM, published 2017.
(Continued)

*Primary Examiner* — Syed A Islam
(74) *Attorney, Agent, or Firm* — Brake Hughes Bellermann LLP

(57) ABSTRACT

A vehicle includes a body structure defining an interior cabin and a multi-position seat that is attached to the body structure and includes a seat cushion and a seatback, and a coupling between the seat cushion and the seatback that positions the seatback between an upright position and a maximum reclined position. Left and right halo members are fixedly attached to the body structure, the left halo member having a first restraining surface above, rearward from, and adjacent to a left shoulder of an occupant of the seat when the seatback is positioned in the maximum reclined position, and the right halo member having a second restraining surface above, rearward from, and adjacent to a right shoulder of the occupant when the seatback is positioned in the maximum reclined position.

20 Claims, 13 Drawing Sheets

(51) Int. Cl.

| | |
|---|---|
| *B60N 2/20* | (2006.01) |
| *B60N 2/427* | (2006.01) |
| *B60N 2/868* | (2018.01) |
| *B60N 2/885* | (2018.01) |
| *G01B 21/16* | (2006.01) |
| *B60N 2/433* | (2006.01) |

(52) U.S. Cl.
CPC ........... *B60N 2/4279* (2013.01); *B60N 2/868* (2018.02); *B60N 2/885* (2018.02); *G01B 21/16* (2013.01); *B60N 2/4228* (2013.01); *B60N 2/433* (2013.01)

(56) References Cited

U.S. PATENT DOCUMENTS

| | | | |
|---|---|---|---|
| 5,564,780 | A | 10/1996 | Presser et al. |
| 5,746,467 | A * | 5/1998 | Jesadanont ............. B60R 22/14 |
| | | | 296/68.1 |
| 7,441,838 | B2 * | 10/2008 | Patwardhan ........... B60N 2/888 |
| | | | 297/216.13 |
| 7,967,375 | B2 | 6/2011 | Yu et al. |
| 7,980,617 | B2 | 7/2011 | Brncick et al. |
| 8,820,831 | B2 * | 9/2014 | Amabile .............. B60N 2/4221 |
| | | | 297/216.14 |
| 8,924,086 | B2 | 12/2014 | Thomas |
| 9,145,078 | B2 | 9/2015 | Locke et al. |
| 9,452,692 | B1 | 9/2016 | Rawlinson et al. |
| 9,463,715 | B1 | 10/2016 | Rawlinson et al. |
| 9,505,367 | B2 * | 11/2016 | Stancato .............. B60N 2/0022 |
| 9,539,924 | B2 | 1/2017 | Maassarani |
| 10,040,373 | B2 | 8/2018 | Rawlinson et al. |
| 10,065,535 | B1 | 9/2018 | Line et al. |
| 10,632,956 | B2 | 4/2020 | Schneider |
| 10,988,055 | B2 | 4/2021 | Glain et al. |
| 11,052,796 | B2 * | 7/2021 | Huf ..................... B60N 2/4221 |
| 11,077,780 | B2 | 8/2021 | Akaike et al. |
| 11,432,653 | B1 | 9/2022 | Gormeley et al. |
| 11,603,070 | B1 | 3/2023 | Lozano Omana et al. |
| 2003/0127268 | A1 | 7/2003 | Bares |
| 2018/0281631 | A1 | 10/2018 | Line et al. |
| 2019/0299897 | A1 * | 10/2019 | Gramenos ............ B60N 2/4279 |

FOREIGN PATENT DOCUMENTS

| | | |
|---|---|---|
| JP | 2020158031 A | 10/2020 |
| WO | 2024052437 A1 | 3/2024 |

OTHER PUBLICATIONS

International Search Report and Written Opinion for PCT Application No. PCT/US2024/024790, mailed on Oct. 25, 2024, 20 pages.

* cited by examiner

800

806

804

802

METHOD AND APPARATUS FOR OPERATING A MULTI-POSITION VEHICLE SEAT AND RESTRAINING AN OCCUPANT OF SUCH SEAT

CROSS-REFERENCE TO RELATED APPLICATION

This application claims benefit, under 35 U.S.C. § 119, of U.S. Provisional Patent Application No. 63/497,381, filed on Apr. 20, 2023, entitled "METHOD AND APPARATUS FOR OPERATING A MULTI-POSITION VEHICLE SEAT AND RESTRAINING AN OCCUPANT OF SUCH SEAT", the disclosure of which is incorporated by reference herein in its entirety.

TECHNICAL FIELD

This document relates to a vehicle seat and, in particular, to a method and apparatus for operating a multi-position vehicle seat and for restraining an occupant of such a seat.

BACKGROUND

Vehicle seats can be designed to be moved into different positions to provide comfort for a user. For example, a vehicle seat can be placed into an upright position, with the seatback in an alignment that is close to vertical, and into a reclined position with the seatback in an alignment that is close to horizontal.

SUMMARY

In some aspects, the techniques described herein relate to a vehicle including: a body structure defining an interior cabin; a multi-position seat within the interior cabin, the multi-position seat being fixedly attached to the body structure and including a seat cushion configured to support buttocks of an occupant of the multi-position seat from a lower side, a seatback configured to support a back of the occupant of the multi-position seat from a rear side, and a coupling between the seat cushion and the seatback, the coupling being configured to position the seatback in a first angular orientation relative to the seat cushion in an upright position and in a second angular orientation relative to the seat cushion in a maximum reclined position; a left halo member fixedly attached to the body structure, the left halo member having a first restraining surface configured to be located above and rearward from, and adjacent to a left shoulder of the occupant of the multi-position seat when the seat is occupied by the occupant and the seatback is positioned in the maximum reclined position, wherein the first restraining surface is configured to, when the seatback is positioned in the maximum reclined position, conform to a shape of a top of the left shoulder of the occupant of the multi-position seat; and a right halo member fixedly attached to the body structure, the right halo member having a second restraining surface configured to be located above, rearward from, and adjacent to a right shoulder of the occupant of the multi-position seat when the seat is occupied by the occupant and the seatback is positioned in the maximum reclined position, wherein the second restraining is configured to, when the seatback is positioned in the maximum reclined position, conform to a shape of a top of the right shoulder of the occupant of the multi-position seat.

In some aspects, the techniques described herein relate to a vehicle including: a body structure defining an interior cabin; a multi-position seat within the interior cabin, the multi-position seat being fixedly attached to the body structure and including a seat cushion configured to support buttocks of an occupant of the multi-position seat from a lower side, a seatback configured to support a back of the occupant of the multi-position seat from a rear side, and a coupling between the seat cushion and the seatback, the coupling being configured to position the seatback in a first angular orientation relative to the seat cushion in an upright position and in a second angular orientation relative to the seat cushion in a reclined position; one or more sensors configured for generating a determination that the vehicle is, or has a probability greater than a threshold value of, within a predetermined time period from the determination, decelerating at a rate greater than a threshold value; a piston member coupled to a portion of the body structure located rearward of the seatback at a first end of the piston member when the multi-position seat is positioned in the reclined position and coupled to the seatback at a second end of the piston member, wherein the piston member is configured to, in response to the determination, automatically extend the second end away from the portion of the body structure, while the piston member remains coupled at the first end to the portion of the body and at the second end to the seatback, to cause the seatback to move from the reclined position to the upright position.

BRIEF DESCRIPTION OF DRAWINGS

Like reference symbols in the various drawings indicate like elements.

DETAILED DESCRIPTION

This document describes examples of systems and techniques that provide a multi-position vehicle seat that can be moved between an upright position and a reclined position. With an occupant sitting in the seat in a reclined position of the seat, the reclined position can put an occupant at heightened risk of injury during a collision of the vehicle. Therefore, techniques and apparatuses are described for sensing an impending rear end or front end collision of the vehicle and moving the vehicle seat from a reclined position to an upright position before an occupant of the seat experiences the full impact of the collision.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger cabin accommodating one or more persons.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
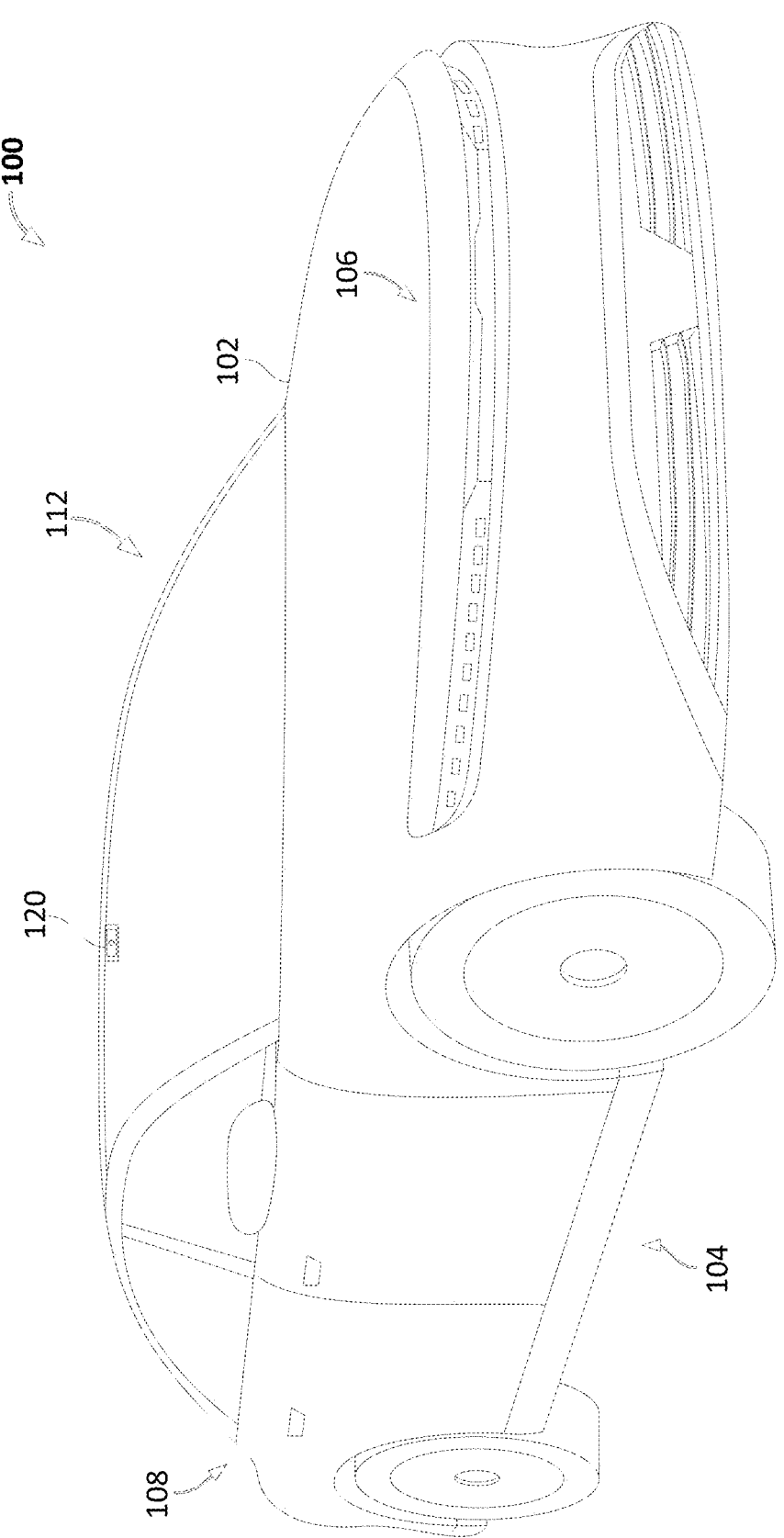
FIG. 1 shows an example of a vehicle.

FIG. 1 shows an example of a vehicle 100. The vehicle 100 can be used with one or more other examples described elsewhere herein. The vehicle 100 includes a vehicle body 102 and a vehicle chassis 104 supporting the vehicle body 102. For example, the vehicle body 102 of FIG. 1 is four-door type with room for at least four occupants, and the vehicle chassis 104 has four wheels. Other numbers of doors, types of vehicle body 102, and/or kinds of vehicle chassis 104 can be used in some implementations.

The vehicle body 102 has a front 106 and a rear 108 and can have a passenger cabin 112 between the front and the rear. The vehicle 100 can have at least one motor, which can be positioned in one or more locations of the vehicle 100. In some implementations, the motor(s) can be mounted generally near the front 106, generally near the rear 108, or both. A battery module can be supported by the chassis 104, for example, below the passenger cabin and can be used to power the motor(s).

The rear 108 of the vehicle 100 can include a trunk compartment, and the front 106 of the vehicle 100 can include a front trunk (a.k.a., frunk) compartment, each of which is outside the passenger cabin and each of which can be used for storage of vehicle components or personal equipment.

The vehicle can include one or more sensors 120. In some implementations, the one or more sensors 120 can include any electromagnetic image sensor (e.g., optical, infrared, RADAR, LIDAR, etc. sensors) whose signal(s) the vehicle 100 processes to perform one or more assisted driving assisted driving (AD) and or advanced driver assistance system (ADAS) functions. For example, a sensor 120 can be oriented in forward-facing direction relative to the vehicle (i.e., facing toward the front 106 of the vehicle 100) and can capture images of scenes in front of the vehicle, where the captured images can be used for detecting vehicles, pedestrians, lanes, lane markings, curbs, and/or road signage. The sensor 120 can detect the surroundings of the vehicle 100 by visually registering a circumstance in relation to the vehicle 100.

The vehicle 100 can include one or more processors (not shown) that can process images captured by the sensor 120, for example, using one or more machine vision algorithms or techniques, to perform various tasks related to one or more driving functions. For example, captured images can be processed to determine a probability of the vehicle colliding with another object.

Figure 2:
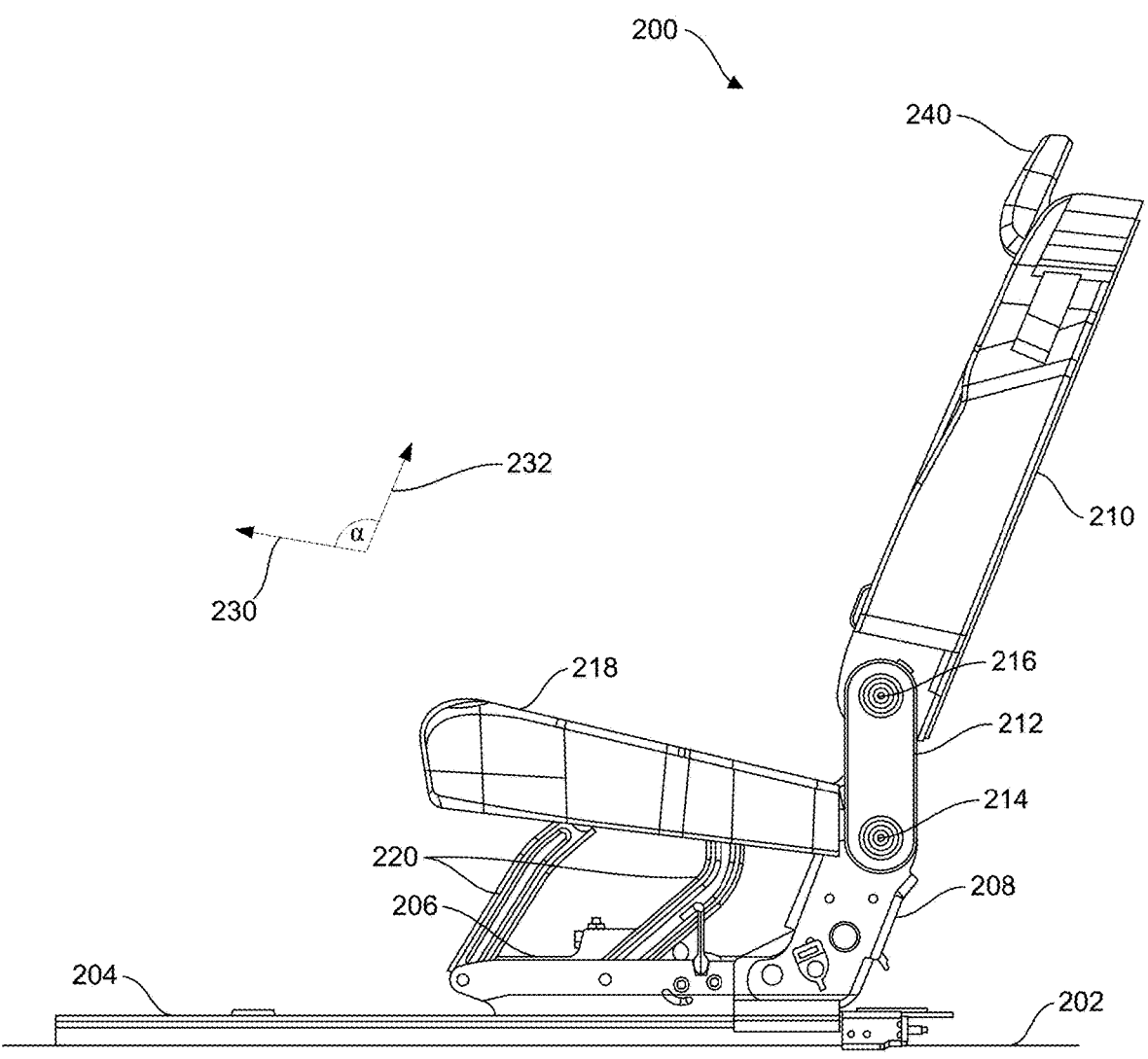
FIG. 2 shows an example of a vehicle seat in an upright position.

The passenger cabin 112 of the vehicle 100 can include one or more seats for supporting an occupant (e.g., a driver and/or one or more passengers) of the vehicle. FIG. 2 shows an example of a vehicle seat 200 in an upright position. The vehicle seat 200 can be used with one or more other examples described elsewhere herein. Some portions of the vehicle seat 200 are omitted in the illustrations for clarity.

In some implementations, the vehicle seat 200 can be attached to one or more rails 204 that are fixedly attached to a floor 202 of the vehicle, where the floor 202 is part of the body structure of the vehicle that defines the interior cabin of the vehicle. The vehicle seat 200 can have one or more risers 206 for engaging with the rail(s) 204. The vehicle seat 200 can have a bracket 208 below the seat cushion 218 and extending from the riser 206. For example, the bracket 208 can include a portion of the riser 206 that extends away from the rail 204, or the bracket 208 can be a separate piece that is mounted to the riser 206. The bracket 208 and/or the riser 206 can be fixedly attached to the rails 204, which in turn are fixedly attached to the floor 202, such that the bracket 208 and/or the riser 206 of the vehicle seat 200 are fixedly attached to the body structure of the vehicle. In this manner, the vehicle seat 200 can be fixedly attached to the body structure of the vehicle, while permitting fore and rear movement of the seat on the rails and other movements of the seat as described herein.

The vehicle seat 200 includes a seatback 210 for supporting the upper body, for example, the back, of an occupant of the seat. The seatback 210 can include a frame covered by a cushion and/or trim. The vehicle seat 200 can include a headrest 240 that is configured to support the head of an occupant of the seat 200. In some implementations, the headrest 240 can be attached to the seatback 210. The vehicle seat 200 can have a seat cushion 218 for an occupant to sit on when the vehicle seat 200 is in the upright position, and the seat cushion can be configured to support the buttocks of the occupant when the vehicle seat 200 is in the upright position. The seat cushion 218 can include a frame covered by a cushion and/or trim. The seat cushion 218 can be mounted to the riser 206 using a four-bar linkage 220. The vehicle seat 200 can include a coupling or a connection link 212 that connects the seatback 210 to the seat cushion 218 and that allows adjustment of an orientation of the seatback 210 with respect to the seat cushion 218, so that the seatback 210 can be positioned in an upright position or in a reclined position. For example, the seat cushion 218 can be located in a first plane that is parallel to a first direction 230, and the seatback 210 can be located in a second plane that is parallel to a second direction 232, where the first and second directions are oriented at an angle, $\alpha$, relative to each other. The connection link 212 can be used to adjust the orientation of the seatback 210 with respect to the seat cushion 218 to vary the angle, $\alpha$, such that the seatback can be positioned in an upright position or in a reclined position.

In some implementations, when the angle, α, is less than 100 degrees, or less than 110 degrees, or less than 120 degrees, the seat can be said to be in an upright position. In some implementations, when the angle, α, is greater than 220 degrees, or greater than 230 degrees, or greater than 240 degrees, the seat can be said to be in a reclined position. The seat can have a maximum reclined position beyond which the cannot be increased. Couplings other than the connection link 212 shown in FIG. 2 can be used in some implementations to couple the seatback 210 and the seat cushion 218. For example, the coupling between the seatback 210 and the seat cushion 218 can include one or more interlinked gears for controlling the angle between the plane of the seatback 210 and the seat cushion 218. In some implementations, the interlinked gears can be driven by one or more motors to change the angular orientation between the seatback 210 and seat cushion 218.

In some implementations, the connection link 212 can form part of the seatback 210 and can have a first end at a pivot 214, such that the seatback 210 including the connection link 212 extends from the pivot 214. The connection link 212 can have a second end (e.g., opposite the first end) at a pivot 216. That is, a remainder of the seatback 210 other than the connection link 212 can be coupled to the pivot 216 and thereby to the connection link 212. As used herein, the pivot 214 continues through the seatback 210 in a direction into the present illustration so that the pivot 214 extends from side to side of the seatback 210. Similarly, the pivot 216 continues through the seatback 210 in a direction into the present illustration so that the pivot 216 extends from side to side of the seatback 210. The vehicle seat 200 can have two instances of the connection link 212 positioned at opposite sides of the seatback 210, of which only one is visible in the present view.

In some implementations, the seat cushion 218 is not attached to the seatback 210 and is not supported by the seatback 210. That is, the seat cushion 218 can be free and does not rest on anything except the four-bar linkage 220. For example, the seat cushion 218 does not rest against the bracket 208. In the upright position of the vehicle seat 200 (e.g., the shown position), a gap can exist between an end of the seat cushion 218 and a lowermost end of the seatback 210. In some implementations, the gap can be covered by a filler piece. For example, the filler piece can be attached to the seatback 210.

The pivot 214 and/or 216 can be used in performing one or more functions of the vehicle seat 200. In some implementations, the pivot 216 can be used when adjusting the seatback 210 in angular relation to the seat cushion 218 (e.g., for greater or lesser incline). For example, this adjustment can be performed using only the pivot 216 and not the pivot 214. In some implementations, the pivot 216 can be used when placing the vehicle seat 200 into an easy entry position (e.g., to create a wider opening for an occupant to enter a subsequent row of seats in the vehicle).

Figure 3A:
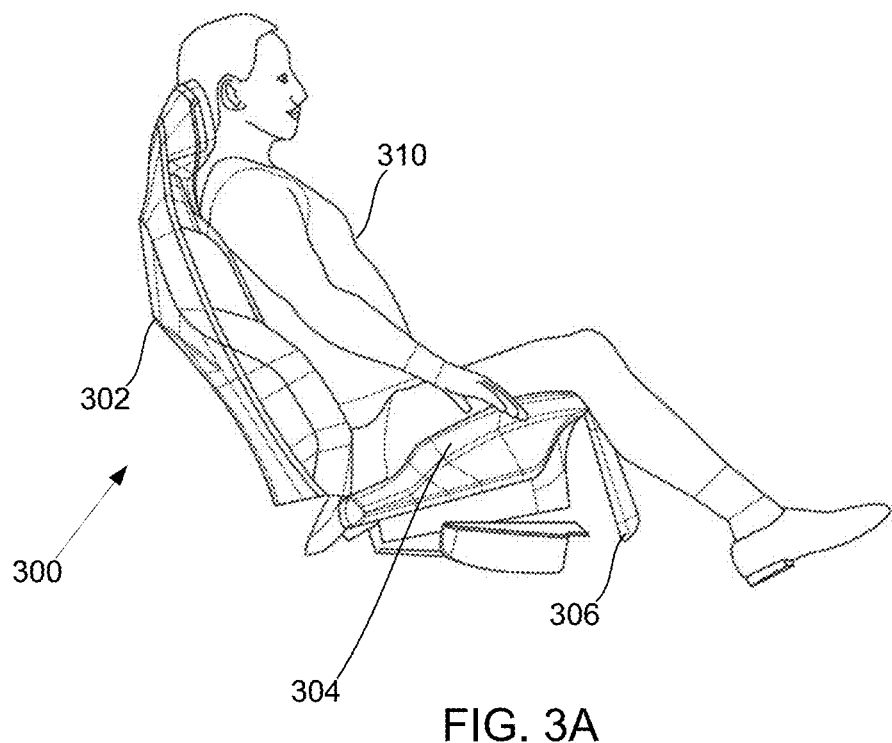
FIG. 3A is a schematic side view of a multi-position seat configured in an upright position and occupied by an occupant.

FIG. 3A is a schematic side view of a multi-position seat 300 configured in an upright position and occupied by an occupant 310. The multi-position seat 300 can include a seatback 302 configured to support a back of the occupant 310 from a rear side. The multi-position seat 300 can include a seat cushion 304 configured to support the buttocks and the thighs of the occupant 310 from a lower side of the occupant. In some implementations, the multi-position seat 300 can include a calf support 306 that is configured to support the calves of the occupant 310. In the upright position depicted in FIG. 3A, the seatback 302 is at a first angular orientation relative to the seat cushion 304, in which an angle formed by the intersection of a plane of the seatback 302 and a plane of the seat cushion 304 is less than a threshold value.

Figure 3B:
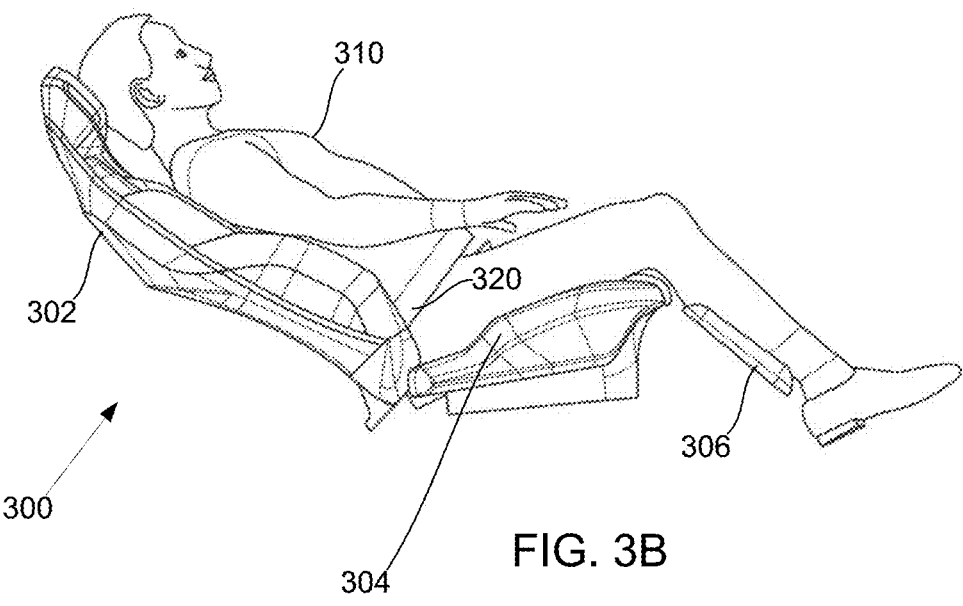
FIG. 3B is a schematic side view of a multi-position seat configured in a reclined position and occupied by an occupant.

FIG. 3B is a schematic side view of the multi-position seat 300 configured in a reclined position and occupied by the occupant 310. As shown in FIG. 3B, the calf support 306 can be configured to extend away from the seat cushion 304 and support the calves of the occupant 310 when the multi-position seat 300 is in the reclined position. In the reclined position depicted in FIG. 3B, the seatback 302 has a second angular orientation relative to the seat cushion 304, in which an angle formed by the intersection of a plane of the seatback 302 and a plane of the seat cushion 304 is greater than the threshold value.

When the multi-position seat 300 is configured in the reclined position, an occupant of the seat can be vulnerable to injury during a rear end collision experienced by the vehicle. For example, when the seat is in an upright position and the vehicle experiences a rear end collision, an occupant of the seat may be held in place by the seat as the vehicle and the seat accelerate rapidly forward in response to the rear end collision. However, when the seat 300 is in a reclined position and the vehicle experiences a rear end collision, the vehicle and the seat 300 may accelerate rapidly forward in response to the force of the rear end collision on the vehicle, but, because of the occupant's position relative to the seat, the occupant may not accelerate forward with the seat. Instead, because the seatback 302 is under but not behind the occupant, the inertia of the mass of the occupant's body may cause the occupant to experience less forward motion than the seat, such that the seat 300 moves forward underneath the body of the occupant 310. Because of this, the body of the occupant may move relatively rearward in the vehicle in response to a rear end collision. If rigid structures of the vehicle are located near, and rearward of, the head of the occupant 310, the occupant 310 may be at heightened risk of experiencing head and/or neck injury as a result of a rear end collision when the seat 300 is in a reclined position.

In such an event, existing seatbelts and airbags may not provide sufficient protection for the occupant 310, because existing seatbelts and airbags generally are designed to protect an occupant from injury when the seat is in an upright position. For example, an occupant of a seat configured in a reclined position may slide under a seatbelt 320 in a rearward direction in the vehicle when the vehicle experiences a rear end collision. In another example, it may be impractical or dangerous to deploy airbags to mitigate this risk. If an airbag were deployed behind the occupant's head when the occupant moves rearward out of the reclined seat, the airbag may collide with the head of the occupant, which may cause head, neck, or spine injury to the occupant.

To mitigate the risk of injury to the occupant 310 when the seat 300 is in the reclined position, one or more halo members can be positioned in the vehicle and fixedly attached to the body structure of the vehicle, where the halo members are configured to engage with the shoulders of the occupant when the occupant begins to move rearward relative to the body of the vehicle when the vehicle experiences a rear end collision.

Figure 4:
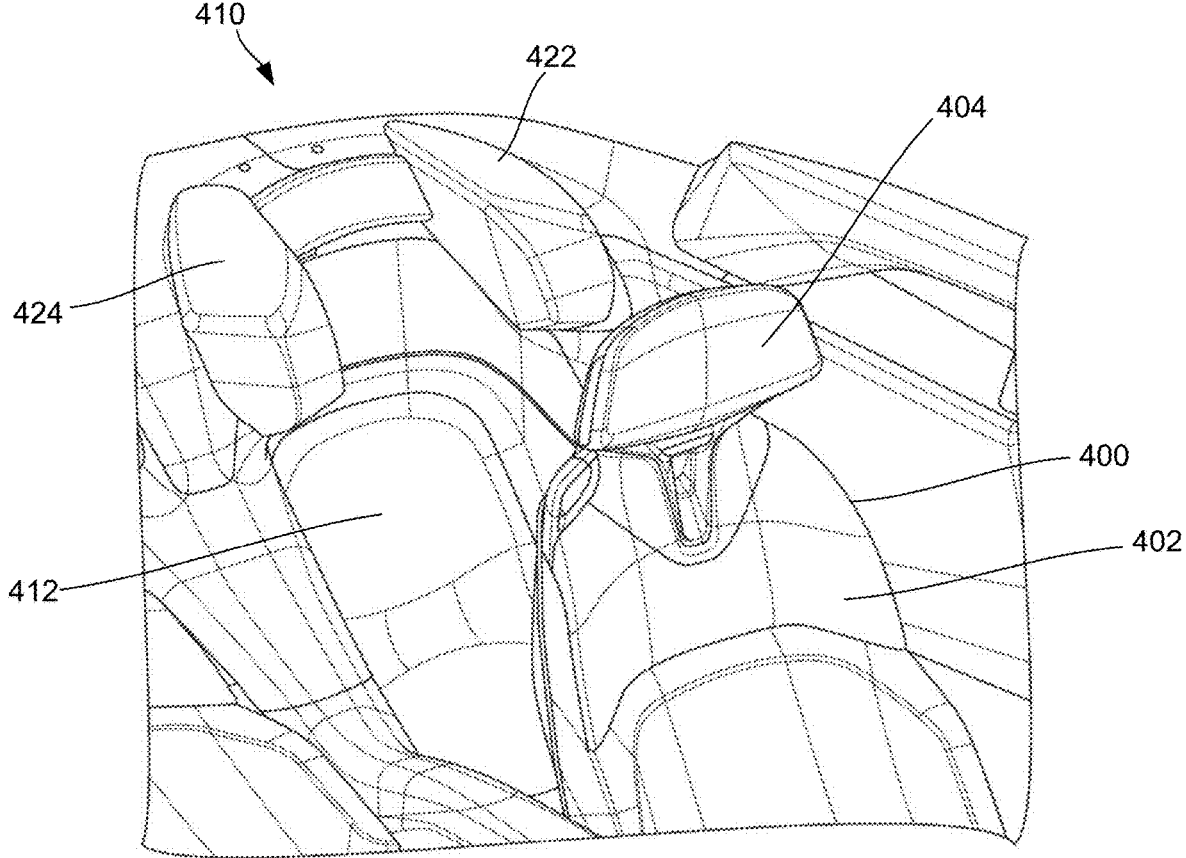
FIG. 4 is a schematic perspective view of a multi-position seat configured in an upright position inside a cabin of a vehicle.

FIG. 4 is a schematic perspective view of a multi-position seat 400 configured in an upright position inside a cabin 410 of a vehicle. The multi-position seat 400 includes a seatback 402 configured to support a back of an occupant of the seat and a headrest 404 configured to support a head of the occupant. The multi-position seat 400 includes the seat cushion (not shown in FIG. 4) and a coupling (not shown in FIG. 4) between the seat cushion and the seatback 402, where the coupling is configured to position the seatback in the upright position or in a reclined position.

The cabin 410 can be defined by a body structure of the vehicle. For example, the body structure can be formed of one or more pieces of rigid structural materials (e.g., aluminum, steel, fiber reinforced plastic, etc.) where the geometry and configuration of the body structure define the interior cabin of the vehicle. In some implementations, one or more trim, cushion, and/or upholstery members can be attached to the body structure to additionally define the interior cabin. The cabin can include a seat receptacle cavity 412 located behind the seat 400 at a rear portion of, or at a rear wall of, the cabin, where the seat receptacle cavity 412 has a geometry, location, and orientation such that it conforms to the geometry, location, and orientation of a backside of the seatback 402 when the seat 400 is in a maximum reclined position. Thus, the seat 400 can nestle into the cavity 412 when the seat is in its maximum reclined position beyond which it cannot be reclined more.

To mitigate the risk of injury to an occupant of the multi-position seat 400 during a rear end collision when the seat 400 is located in the maximum reclined position, a left halo member 422 and a right halo member 424 can be located in the cabin such that they restrain the occupant from moving rearward relative to the vehicle and the seat 400 when the vehicle experiences a rear end collision. The left and right halo members 422, 424 can include an internal structural frame covered by a cushioned surface material, and can be fixedly attached to body structure of the vehicle and extend into the cabin. The left and right halo members 422, 424 can be located above and rearward from, and adjacent to, the occupant's left and right shoulders, respectively, when the occupant is seated in the maximum reclined position of the seat, so as to restrain the occupant by making contact with the shoulders of the occupant. Then, when the occupant begins to move rearward relative to the vehicle when the vehicle experiences a rear end collision, the left and right halo members 422, 424 can block the shoulders of the occupant, and therefore the body of the occupant, from sliding rearward and out of the seat 400.

Figure 5:
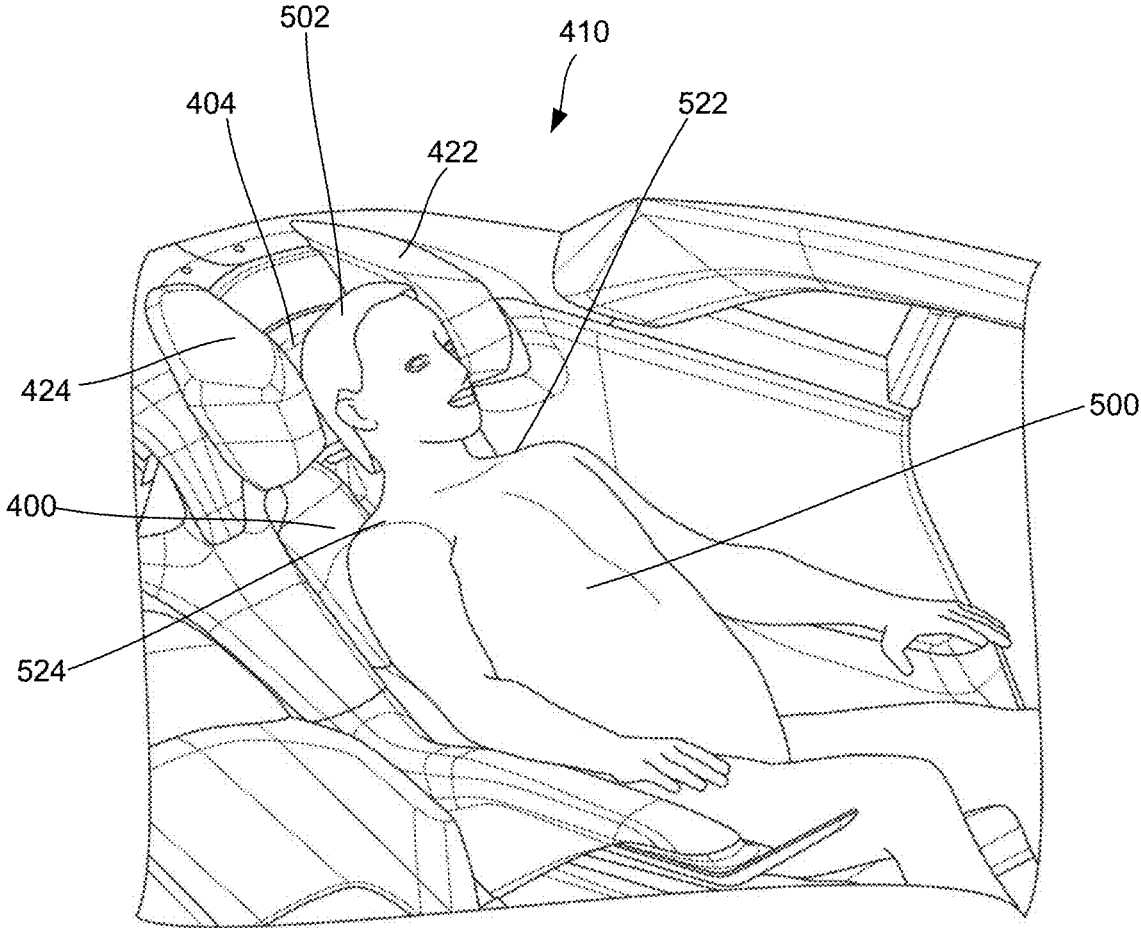
FIG. 5 is a schematic front view of the multi-position seat configured in a maximum reclined position inside the cabin of a vehicle.

FIG. 5 is a schematic perspective view of the multi-position seat 400 configured in a maximum reclined position inside the cabin 410 of a vehicle. As explained above, the left and right halo members 422, 424 can be located above and rearward from, and adjacent to, the left and right shoulders 522, 524, of the occupant 500. The headrest 404 of the seat can be configured to support a head 502 of the occupant from the rear side, and the headrest can be further configured to position the head 502 of the occupant laterally between the left halo member 422 and the right halo member 424 when the seat 400 is occupied by the occupant and the seatback 402 is positioned in the maximum reclined position.

Figure 6:
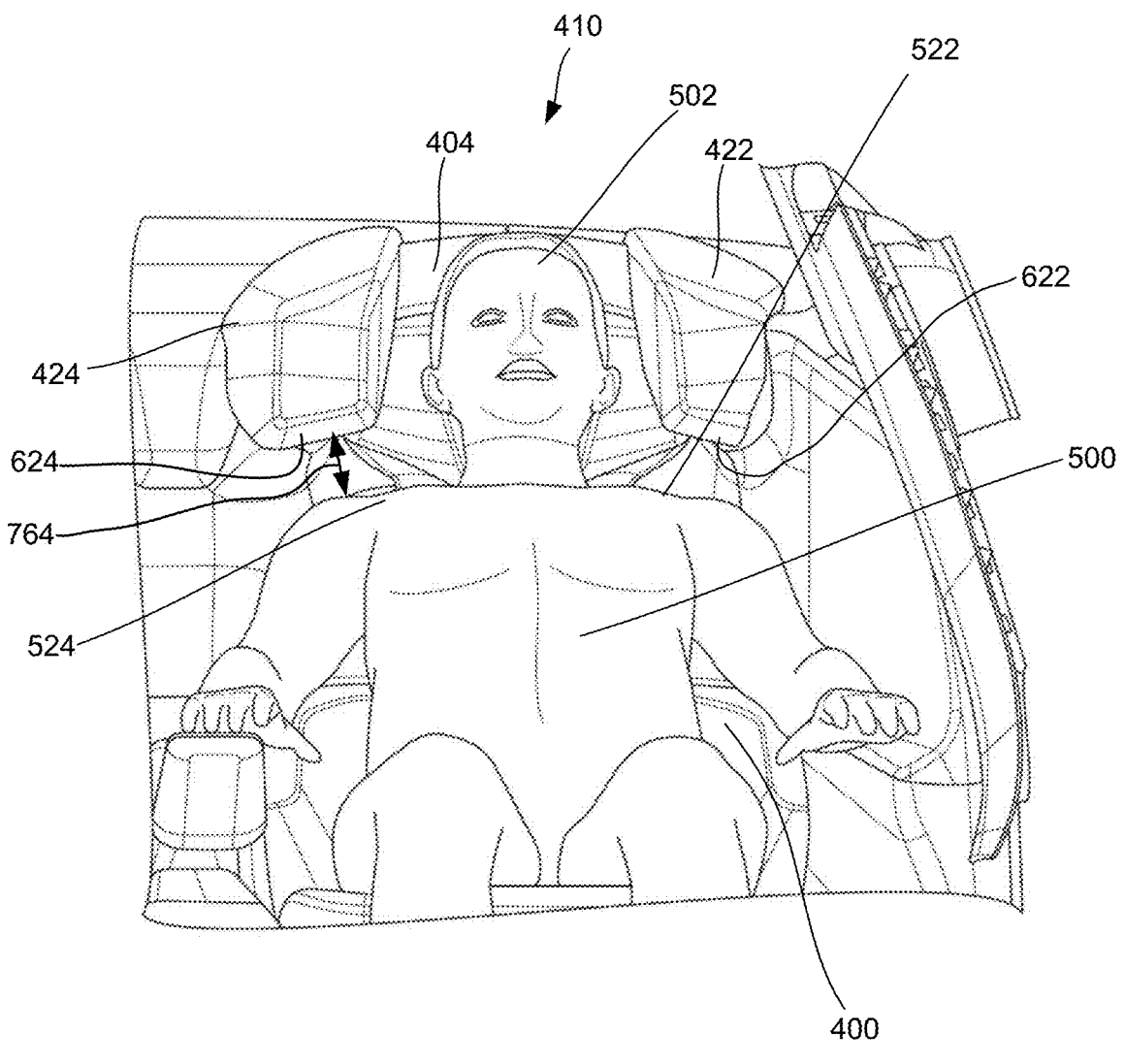
FIG. 6 is a schematic front view of the multi-position seat configured in a maximum reclined position inside the cabin of a vehicle.

FIG. 6 is a schematic front view of the multi-position seat 400 configured in a maximum reclined position inside the cabin 410 of a vehicle. When in the maximum reclined position, the left and right halo members 422, 424 can be located above and rearward from, and adjacent to, the occupant's left and right shoulders 522, 524, respectively. The left and right halo members 422, 424 can include first and second restraining surfaces 622, 624, respectively, at the bottom portions of the halo members (i.e., at the side of the halo members that are proximate to the shoulders of the occupant). In some implementations, the first and second restraining surfaces 622, 624, respectively, can be configured to conform to the shape of a top of the left and right shoulders 522, 524 of the occupant 500. For example, the restraining surfaces 622, 624 can have three-dimensional shapes that are substantially complementary to the three-dimensional shapes of the left and right shoulders 522, 524 of the occupant 500. In some implementations the first and second restraining surfaces 622, 624 of the left and right halo members 422, 424 can be located at a distance less than about 10 cm from the left and right shoulders 522, 524, respectively, of the occupant 500 when the seat is occupied by the occupant and the seatback is positioned in the maximum reclined position. Because of the short distance between the occupant's shoulders and the restraining surfaces 622, 624, in the event that a rear end collision causes the occupant to move rearward relative to the vehicle, the speed of the occupant relative to the seat would be relatively low when the shoulders of the occupant contact the first and second restraining surfaces.

Figure 7:
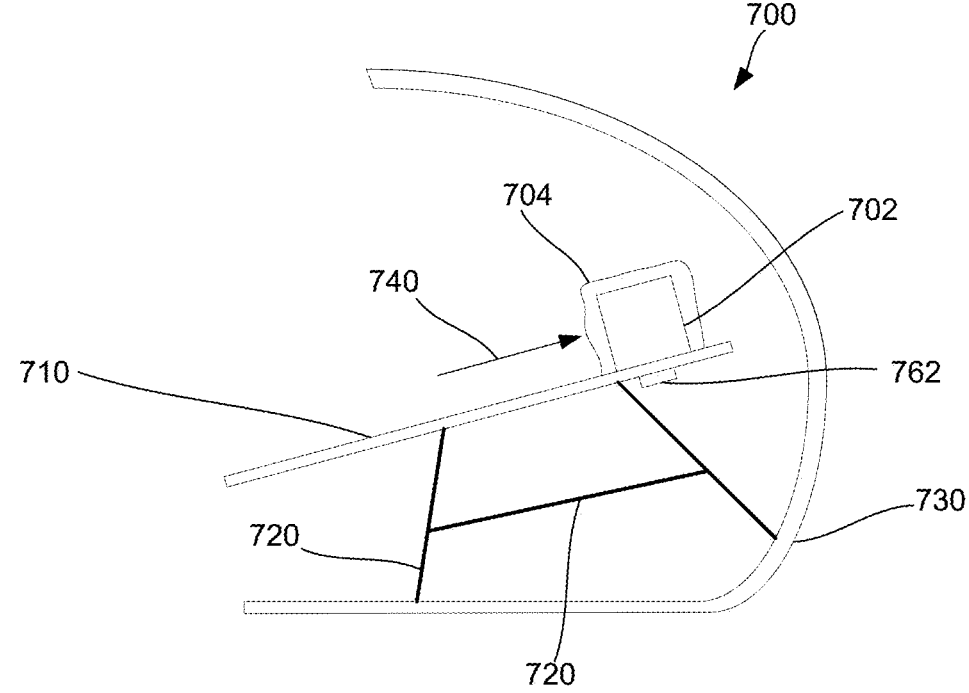
FIG. 7 is a schematic diagram of a halo member fixedly attached to a body structure of a vehicle.

FIG. 7 is a schematic diagram of a halo member 700 fixedly attached to a body structure 730 of a vehicle. A front of the vehicle can be toward the left side of FIG. 7, and a rear of the vehicle can be toward the right side of FIG. 7. The halo member 700 can include a rigid frame structure 702 that is covered with a softer, compliant cushion material 704. The frame structure 702 of the halo member can be secured to a wall 710 (e.g., a wall that defines an interior cabin of the vehicle). The wall can define, or can support trim components that define, the cavity 412 (FIG. 4) into which a multi-position seat nestles when the seat is in the maximum reclined position. For example, when the seat is in the maximum reclined position, a seatback of the seat can be oriented close to parallel to the wall 710, such that a spine of an occupant of the seat is close to parallel to the wall, with a shoulder of the occupant being just to the left of the halo member 700. The wall can be attached to the body structure 730 by one or more structural support members, which may include one or more frame members 720. The halo member may be configured to absorb a force applied to the halo member 700, for example, by an occupant of the vehicle seated in a reclined seat when the vehicle experiences a rear end collision and the occupant moves rearward into the halo structure, where the force has direction 740 that includes a component parallel to the wall 710.

In one implementation, the cushion material 704 of the halo member 700 is configured to be compressed when a shoulder of an occupant of the vehicle impacts the restraining surface of the halo member, for example, due to the occupant moving rearward relative to the vehicle when the vehicle experiences in rear end collision. In an implementation, the cushion material 704 can be configured to be compressed by less than 1 cm when the shoulder of the occupant impacts the restraining surface force less than 1000 N, but the cushion material 704 can be configured to be compressed by greater than 1 cm when the shoulder of the occupant impacts the restraining surface with a force greater than a threshold value, where the threshold value is a value greater than 1000 N (e.g., 1500 N, 3000 N, 5000 N).

Figure 8:
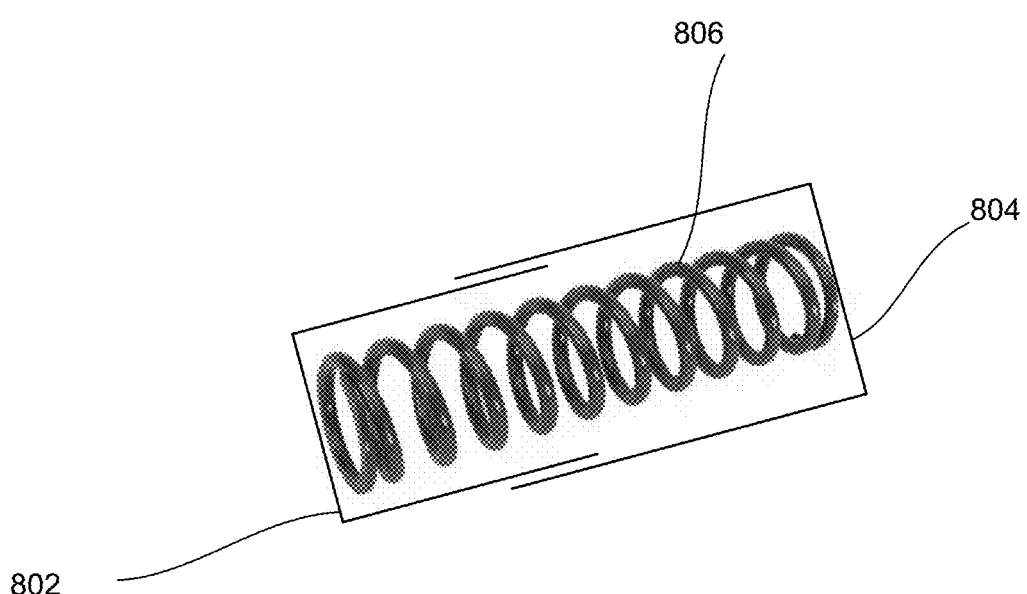
FIG. 8 is a schematic diagram of a halo member that includes a spring that absorbs a force of an impact.

In an implementation, the halo member 700 can include a frame and a spring, wherein the spring is configured to be compressed in response to the force along the direction 740. FIG. 8 is a schematic diagram of a halo member 800 that includes a spring that absorbs a force of an impact. The halo member 800 can include a frame portion and a cushioned surface material. For example, in one implementation, the frame can include a first end portion 802 and the second end portion 804 where the first end portion 802 is at least partially contained within the second portion 804. A spring 806 located within a cavity defined by the first and portion 802 and the second end portion 804 can bias the first end portion 802 away from the second end portion 804. The second end portion 804 can be attached to a wall (e.g., wall 710) that the is fixedly attached to a body structure, while the first end portion 802 can be unattached to the wall 710 and permitted to move in response to a force being applied to the first end portion 802. Then, when a force is applied along a direction substantially parallel to an axis of the spring 806 (e.g., along direction 740 of FIG. 7) to the halo member 800, the spring 806 can be compressed to allow the first end portion 802 to move toward the second end portion 804. In this manner, the momentum of the occupant that moves relative to the vehicle in response to a rear end collision can be reduced over a longer time than would be the case if the halo member 800 did not deform or move when a force were applied to the halo member, and therefore the force on the shoulders of the occupant of the vehicle can be lower than would be the case if the halo member 800 did not deform or move in response to the force.

Referring again to FIG. 7, in some implementations, the vehicle can include a vertical motor 762 configured to move the halo member 700 in the direction 740 along the wall 710 to place the halo member 700 in a position such that a restraining surface of the halo member is within a threshold distance of a shoulder of the occupant. For example, referring again to FIG. 6, a distance 764 is indicated between restraining surface 624 and the right shoulder 524 of the occupant 500. Referring again to FIG. 7, in some implementations, the halo member 700 can be attached to the wall 710 along a rail or rack that guides the movement of the halo member, and the vertical motor 762 can drive one or more gear assemblies that move the halo member.

In some implementations, the vertical motor 762 can be controlled in response to input from the occupant 500 to control the distance 764 between a shoulder of the occupant and a restraining surface of a halo member. In some implementations, the vertical motor 762 can be controlled automatically (i.e., without direct human input) to control the distance 764 between a shoulder of the occupant and a restraining surface of the halo member. For example, a distance sensor (e.g., an optical, infrared, or ultrasonic sensor) in or near the halo member can determine a distance between the restraining surface and a shoulder 524 of the occupant 500, and the vertical motor 762 can move the halo member 700 automatically until the determined distance is less than a threshold distance. In some implementations, the threshold distance can be 10 cm. Thus, the halo member 700 can be moved automatically into a predetermined position relative to the shoulders of different occupants to restrain occupants of different sizes and in different postures and positions and for different positions of the seat cushion relative to the seatback.

Figure 9:
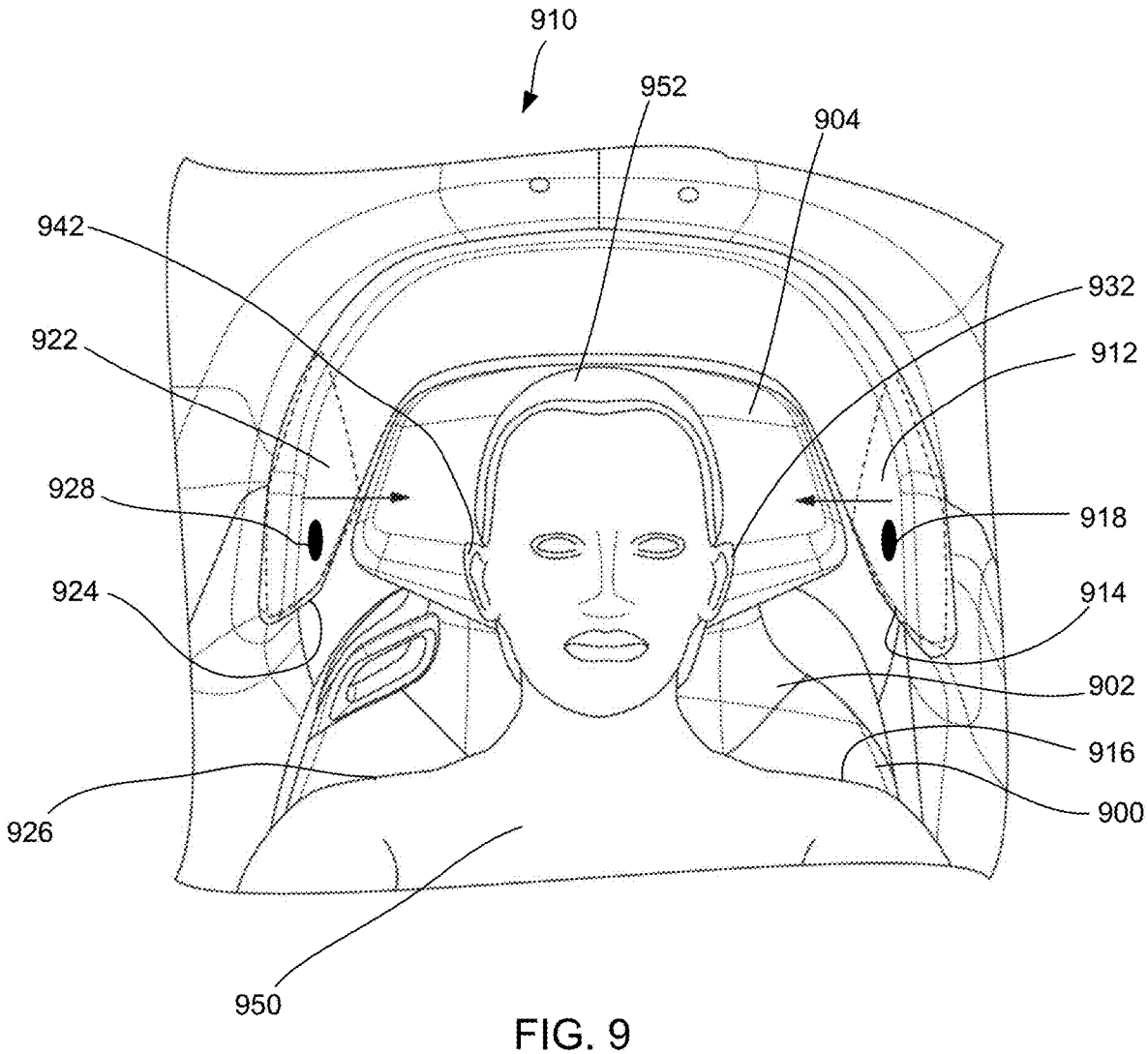
FIG. 9 is a schematic front view of a multi-position seat configured in a maximum reclined position inside a cabin of a vehicle.

FIG. 9 is a schematic front view of a multi-position seat 900 configured in a maximum reclined position inside a cabin 910 of a vehicle. The multi-position seat 900 has a seatback 902 and headrest 904. A left halo member 912 has a first restraining surface 914 configured to be located above and rearward from, and adjacent to a left shoulder 916 of the occupant of the multi-position seat 900 when the seat is occupied by the occupant and the seatback is positioned in the maximum reclined position. A right halo member 922 has a second restraining surface 924 configured to be located above and rearward from, and adjacent to a right shoulder 926 of the occupant of the multi-position seat 900 when the seat is occupied by the occupant and the seatback is positioned in the maximum reclined position. The left and right halo members 912, 922 can be located in first positions distal from the left and right ears 932, 942, respectively, of a head

952 of an occupant 950 when the vehicle is in a normal operating condition and can be configured to be moved to second positions proximate to the left and right ears 932, 942 when a determination is generated that indicates a probability greater than threshold probability that the vehicle has experienced, or will experience, a rear end collision. The direction of this movement is indicated in FIG. 9 by the arrows having tails on the left and right halo members 912, 922. In some implementations, the vehicle can include an accelerometer configured for determining an acceleration of the vehicle, and the determination that indicates a probability greater than threshold probability that the vehicle has experienced a rear end collision can include a determination of an acceleration that excess a threshold value. In some implementations, the accelerometer can be located in a rear portion of the vehicle (e.g., near the rear bumper), so that as the vehicle absorbs the impact of the collision, the accelerometer may determine a rapid increase of acceleration at the rear of the vehicle before the full force of the collision is experienced by, and in, the passenger cabin of the vehicle. In some implementations, the threshold value can be a value greater than 30 meters per second per second.

In some implementations, in response to a determination of an acceleration that exceeds a threshold value, the left and right halo members 912, 922 can be moved from their first positions to their second positions proximate to the left and right ears 932, 942 of the occupant. In some implementations, the movement of a halo member 912, 922 from its first position to its second position can occur in less than 100 ms. Thus, the movement of the halo members can occur after a determination is made that the vehicle has experienced, or will experience, a rear end collision, and the movement can occur in a sufficiently short time to allow the halo members 912, 922 to be placed in the second positions to restrain the occupant before the occupant a significant distance rearward in the cabin of the vehicle. In this manner, the halo member 912, 922 can normally be located in their first positions to allow for greater space around the occupant's head but can be rapidly deployed into their second positions where they can restrain movement of the occupant in the event of a rear end collision.

The halo members 912, 922 can be moved from their first positions to their second positions by first and second horizontal motors, respectively, that, in response to the determination of an acceleration that exceeds a threshold value, cause the movement of the halo members. In some implementations, the horizontal motors can be the same as the vertical motors described above, and a motor can cause both the horizontal movement of a halo member in a direction proximate to an ear of the occupant and the vertical movement of a restraining surface of the halo toward a shoulder of the occupant. In some implementations, pneumatic devices, such as those described below, can be used to cause at least the horizonal movement of the halo members 912, 922.

In some implementations, because the halo member 912, 922 may be moved at high velocities from their first positions distal from the occupant's ears to their second positions proximate to the occupant's ears, measures may be taken to avoid the halo members impacting a side of the occupant's head during the movement. For example, the left halo member 912 can include a first distance sensor 918 and the right halo member 922 can include a first distance sensor 928, where the distance sensors 918, 928 are configured for determining, respectively, a first distance between the left halo member 912 and a left side of the occupant's head and a second distance between the right halo member 922 and a right side of the occupant's head. The horizontal motors that control the movement of the halo members 912, 922 from their first positions to their second positions can be configured to, in response to the determined distances, stop the movement of the each of the halo members before a halo member contacts the occupant's head.

Referring again to FIG. 3B, when the multi-position seat 300 is in the reclined position, the occupant 310 of the seat is at risk of injury when the vehicle experiences a front end collision, because when the vehicle decelerates rapidly as a result of the collision, the inertia of the occupant's body may cause the occupant to move forward in the cabin of the vehicle and out of the seat. When an occupant 310 is seated in a reclined position of the seat and the vehicle experiences a front end collision, a lap seatbelt may be relatively ineffective at restraining the occupant 310, as compared to when the seat is in an upright position, because the occupant may be able to slide forward under the lap seatbelt and out of the seat 300. In addition, in such a situation a shoulder seatbelt also may be relatively ineffective, as compared to when the seat 300 is in an upright position, because the body of the occupant 310 may slide under the shoulder seatbelt and/or the shoulder seatbelt may snag around the neck of the occupant 310 as the occupant slides forward during the front end collision, which may injure the neck or head of the occupant.

To mitigate this risk of injury to an occupant of the seat in a reclined position during a front end collision, conditions of, and around, the vehicle can be monitored, and, based on the monitored conditions, a determination can be generated that the vehicle is decelerating at a rate greater than threshold value, or has a probability greater than a threshold value of decelerating at a rate greater than a threshold value in the near future (e.g., within a predetermined time period from the determination, such as, for example, 10 seconds, five seconds, or three seconds). In some implementations, the threshold value can be a value greater than 30 meters per second per second. Then, in response to the generated determination, the seat can be automatically moved from its reclined position to an upright position to reduce the risk of injury to the occupant of the seat.

Figure 10A:
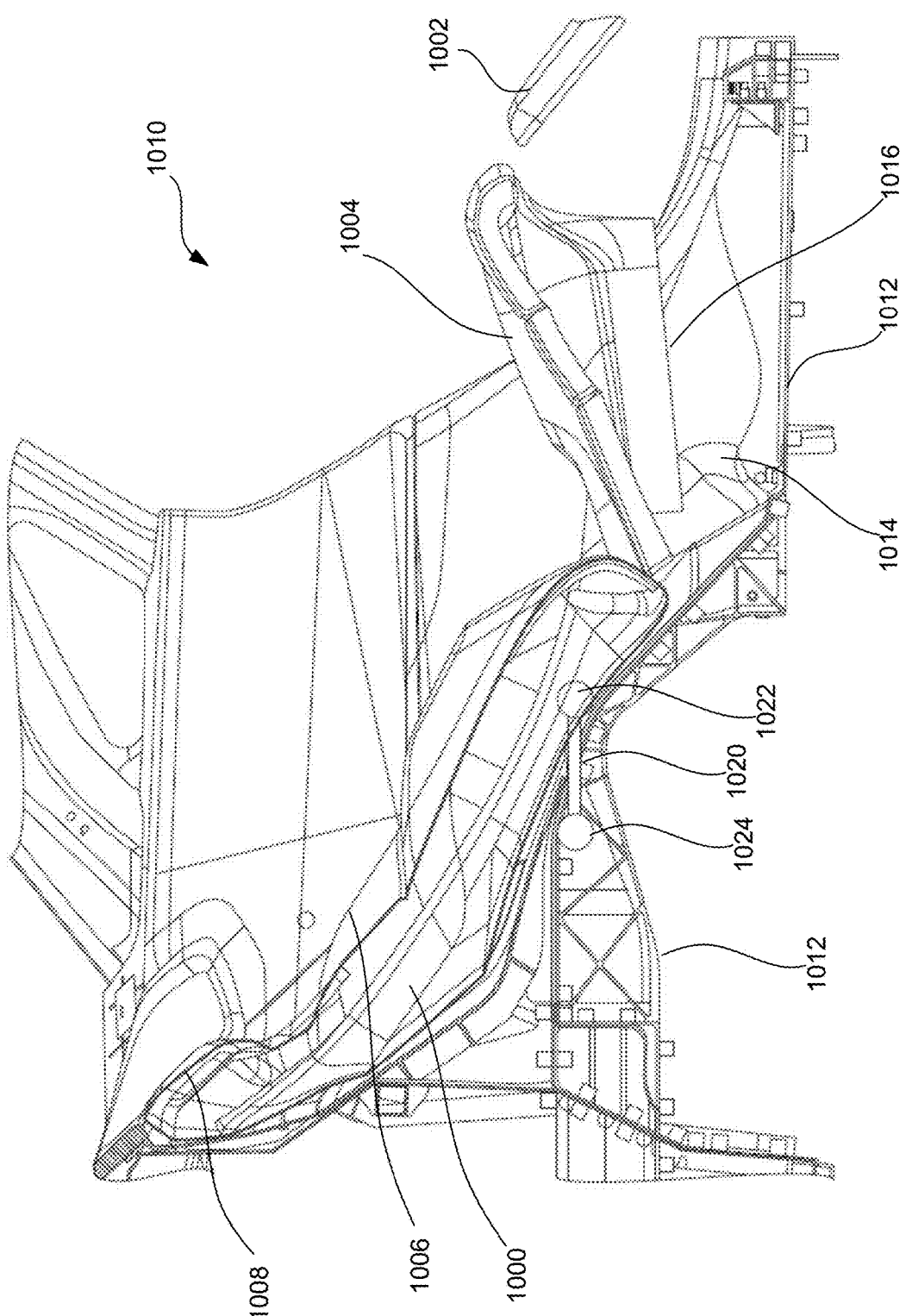
FIG. 10A is a schematic side view of a portion of a vehicle having a multi-position seat configured in a maximum reclined position within a cabin defined by a body structure of the vehicle.
Figure 10B:
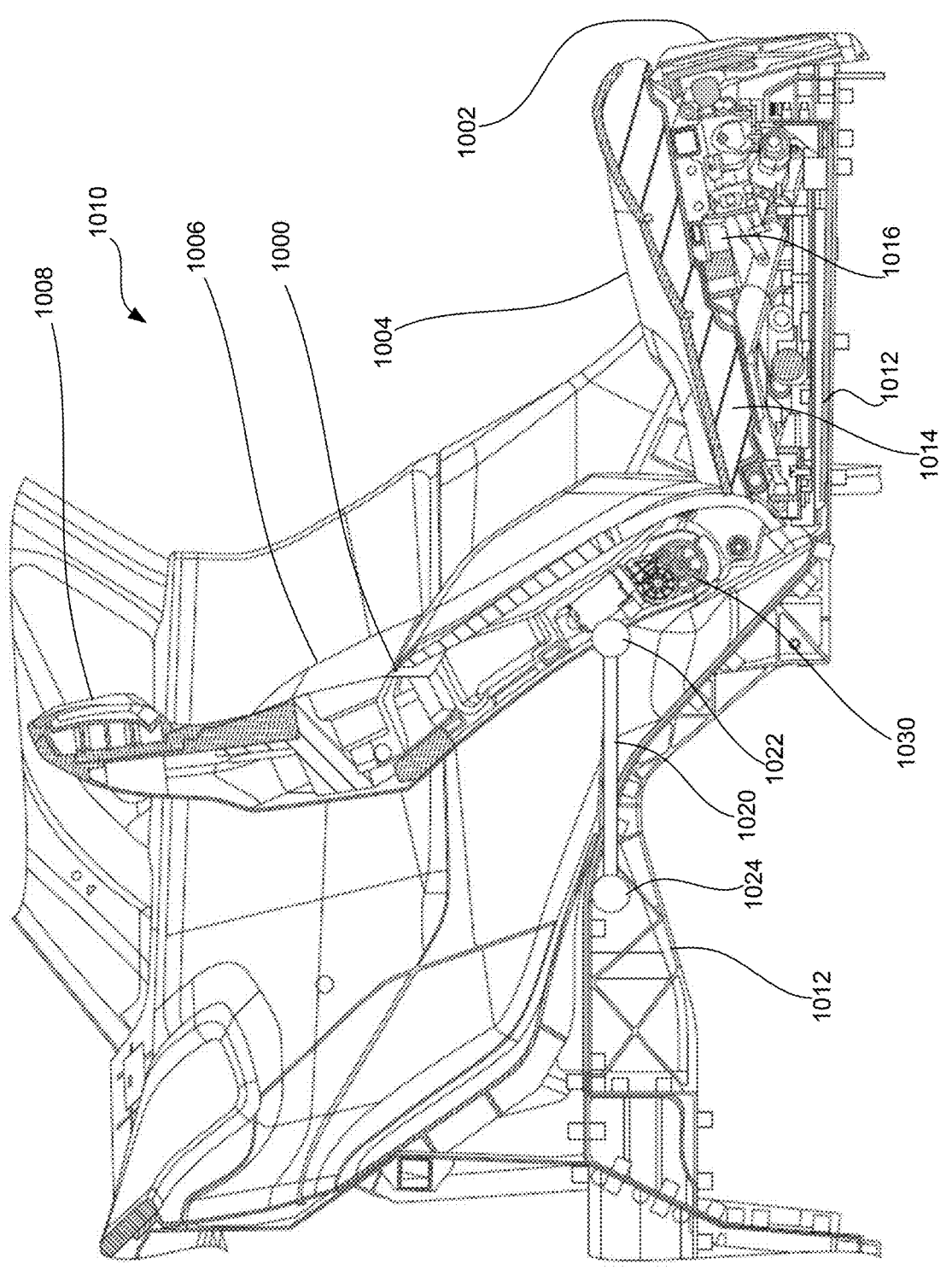
FIG. 10B is a schematic side view the multi-position seat configured in an upright position.

FIG. 10A is a schematic side view of a portion of a vehicle having a multi-position seat 1000 configured in a maximum reclined position within a cabin 1010 defined by a body structure 1012 of the vehicle. FIG. 10B is a schematic side view of the multi-position seat 1000 configured in an upright position. The multi-position seat 1000 includes a calf rest 1002, a seat cushion 1004, a seatback 1006, and a headrest 1008. The multi-position seat 1000 is fixedly attached to the body structure 1012 of the vehicle, for example, by one or more structural brackets 1014 that connect a bottom portion 1016 of the seat to the body structure 1012.

The vehicle also includes a piston member 1020 that is coupled to a portion of the body structure 1012 at a first end 1024 of the piston member and that is coupled to the seatback 1006 at a second end 1022 of the piston member when the seat 1000 is configured in a reclined position. In response to a determination that the vehicle is decelerating at a rate greater than threshold value, or has a probability greater than a threshold value of decelerating at a rate greater than a threshold value in the near future, the piston member can automatically extend the second end 1022 away from the portion of the body structure to which the first end 1024 is attached, while the piston member remains coupled at the first end to the body structure. The extension of the piston member 1020 can produce a force on the rear side of the seatback toward the front of the vehicle to cause the seatback 1006 to move from the reclined position to the upright position.

In some implementations, the vehicle can include an accelerometer configured for determining a deceleration of the vehicle, and the determination that indicates a probability greater than threshold probability that the vehicle has experienced a rear end collision can include a determination of a deceleration that exceeds a threshold value. In some implementations, the accelerometer can be located in a front portion of the vehicle (e.g., near the front bumper), so that as the vehicle absorbs the impact of the collision, the accelerometer may determine a rapid deceleration at the rear of the vehicle before the full force of the collision is experienced by, and in, the passenger cabin of the vehicle.

Although one piston member 1020 is depicted in FIGS. 10A and 10B, the vehicle can include a plurality of piston members that together can be configured to apply a force to the rear of the seatback 1006 to move the seat from the reclined position shown in FIG. 10A to the upright position in FIG. 10B.

In some implementations, the piston member 1020 can include a pneumatic cylinder in which gas pressure causes the extension of the second end 1022 of the piston member away from the first end 1024. For example, a pressurized gas source can supply gas to the pneumatic cylinder to drive the second end 1022 away from the first end. In another example, a gas source created by a pyrotechnic explosion can supply gas to the pneumatic cylinder to drive the second end 1022 away from the first end. For example, the piston member 1020 can include a chemical source and an igniter that ignites a chemical reaction of the chemical source materials, which produces and supplies the gas to drive the pneumatic cylinder. In some implementations, gas can be supplied from the gas source to the pneumatic cylinder at a rate sufficient to move the multi-position seat 1000 from the reclined position to the upright position in less than 100 ms or in less than 50 ms.

Figure 11:
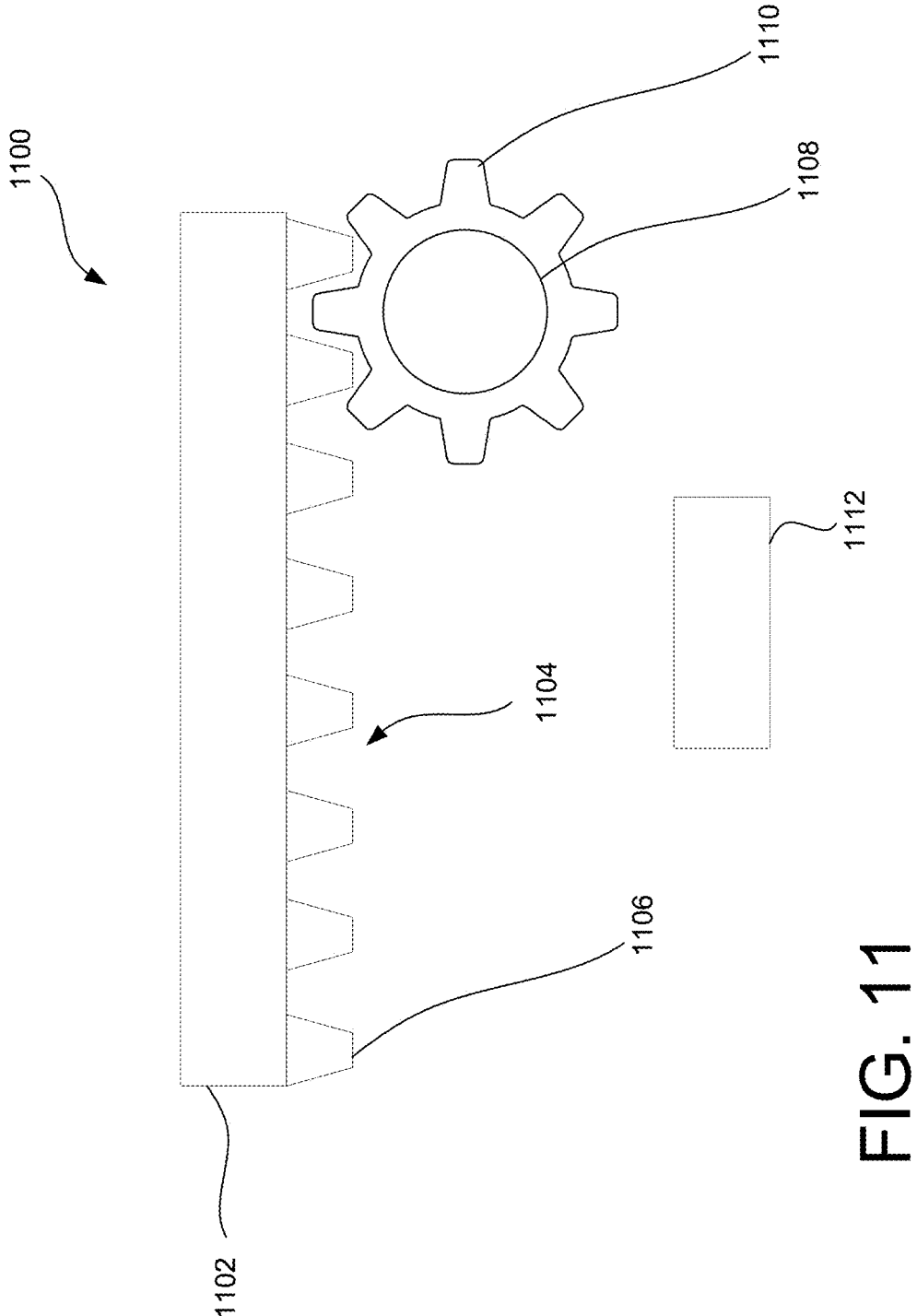
FIG. 11 is a schematic diagram of a portion of a piston member that can be extended mechanically.

In some implementations, in response to a determination that the vehicle is decelerating at a rate greater than threshold value, or has a probability greater than a threshold value of decelerating at a rate greater than a threshold value in the near future, the second end 1022 of the piston member 1020 can be extended mechanically away from the first end 1024 toward the seatback 1006 or the piston as a whole can be moved mechanically toward the seatback 1006. FIG. 11 is a schematic diagram of a portion of a piston member 1100 that can be extended mechanically. In some implementations, the piston member 1100 can include a shaft 1102 that includes, or that is coupled to, a rack 1104 having a plurality of teeth 1106 that can engage with a gear 1108 having a plurality of teeth 1110 that are complementary to the plurality of teeth of the rack. A motor 1112 can drive the gear 1108, which can engage with the rack 1104, to cause the rack to move along its length and to extend a second end of the piston member toward the seatback of the seat.

In some implementations, the angular orientation of the seatback 1006 relative to the seat cushion 1004 can be controlled by a connection link 1030 that connects the seatback 1006 to the seat cushion. The connection link 1030 can include one or more gears driven by a motor, where movement of the gears driven by the motor changes the angular orientation of the seatback 1006 relative to the seat cushion 1004 (e.g., between the reclined position and the upright position). In some implementations, the motor can include a high-speed, high-torque motor that can rapidly change the angular orientation of the seatback relative to the seat cushion. For example, the motor can drive the gears to cause the seatback, when occupied by a human, to move from the reclined position to an upright position in less than one second, in less than 500 ms, in less than 200 ms, or in less than 75 ms.

In some implementations, while movement of the piston member due to the provision of gas to a pneumatic cylinder of the piston member can occur very quickly (e.g., to move the seat from the reclined position to the upright position in less than 100 ms or in less than 50 ms), mechanical movement of the piston member can occur over a longer timescale. For example, mechanical movement of the piston member to move the seat from the reclined to the upright position, such as caused by driving a mechanical gear, or movement of the seatback caused by mechanical movement of a connection link between the seatback and the seat cushion (e.g., caused by motor-driven gears in the connection link) to move the seat from the reclined to the upright position, can occur over a timescale greater than 100 ms, greater than 300 ms, or greater than one second. In some cases, such a timescale may be too slow to move the seatback from a maximum reclined position to an upright position in time to position an occupant of the seat in an upright position before the occupant experiences the force of the head on collision, if the movement of the seatback is caused only by mechanical movement of the piston member or of the connection link that occurs after a determination is made that the vehicle is decelerating at a rate greater than the threshold value. However, when the mechanical movement of the piston member or of the connection link occurs in response to a determination that the vehicle has a probability greater than a threshold value of decelerating at a rate greater than a threshold value in the near future (e.g., as determined by input from one or more sensors), the mechanical movement of the piston member or of the connection link can begin early enough in advance of a collision, such that the mechanical movement of the piston member or of the connection link can place the seat in an upright position in time to position the occupant of the seat in an upright position before the occupant experiences the force of the head on collision. The relatively slower movement of the seatback due to mechanical movement of the piston member or of the connection link, as compared with the faster movement of the seatback due to pneumatic movement of the piston member can provide a lower, less violent, force on an occupant of the seat. In addition, movement of the seatback due to mechanical movement of the piston member from the reclined position to the upright position may be easily reversible, whereas, pneumatic movement of the piston member if caused by a pyrotechnic explosion to release the gas to move the pneumatic piston may less easy to reverse.

In some implementations, the piston member can be moved to cause movement of the seat from the reclined position to the upright position due to a combination of forces on the piston member, including both a pneumatic force from the provision of gas to a pneumatic cylinder of the piston member and due to a mechanical force on the piston member to mechanically move the piston member. In some implementations, movement of the piston member due to a mechanical force on the piston member can occur in response to a determination that the vehicle has a probability greater than a threshold value of decelerating at a rate greater than a threshold value in the near future and movement of the piston member due to a pneumatic force on the piston member can occur in response to a determination that a portion of the vehicle is currently decelerating at a rate greater than the threshold value.

In some implementations, the piston member 1020 is not coupled to the seatback 1006 when the seat 1000 is positioned in the upright position before the piston member is automatically extended. That is, the piston member 1020 can be generally configured in its unextended position during normal operation of the vehicle, such that is does not extend away from the body structure 1012, or extends relatively little away from the body structure 1012, into the space between the body structure and the seatback, during normal operation of the vehicle. However, when the seat 1000 is in its reclined position, the second end 1022 of the piston member 1020 can couple to the rear of the seatback 1006. For example, by moving the seat 1000 into its reclined position, the seatback 1006 can be moved rearward toward the second end 1022 of the piston member until it touches and couples to the second end of the piston. Then, once the second end 1022 of the piston member is coupled to the seatback 1006, the piston member can be ready to be automatically extended away from the portion of the body structure to cause the seatback 1006 from the reclined position to the upright position.

In some implementations, the vehicle can include a plurality of sensors to determine that the vehicle is decelerating at a rate greater than threshold value, or has probability greater than a threshold value of decelerating at a rate greater than a threshold value in the near future. The plurality of sensors can be part of an ADAS/AD system.

Figure 12:
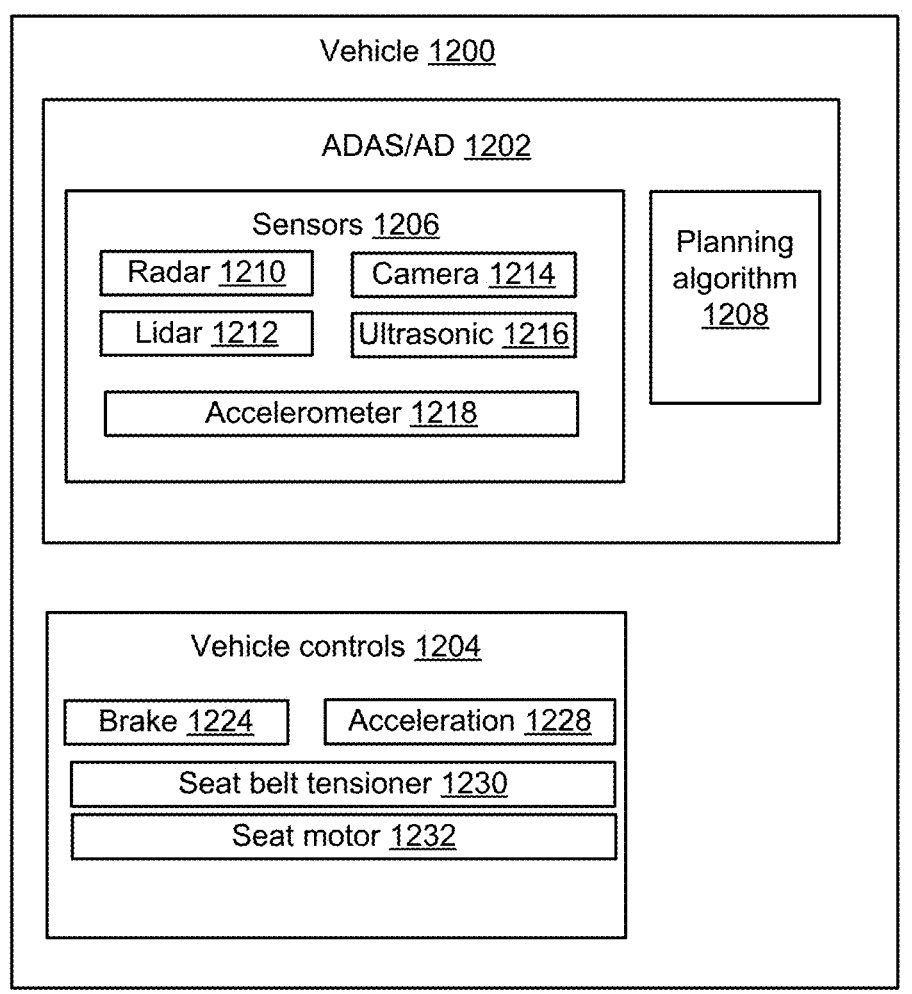
FIG. 12 shows an example of a vehicle that includes an ADAS/AD system and vehicle controls.

FIG. 12 shows an example of a vehicle 1200 that includes an ADAS/AD system 1202 and vehicle controls 1204. The ADAS/AD system 1202 includes sensors 1206 and a planning algorithm 1208. Other aspects that the vehicle 1200 may include other components of the vehicle 1200 where the ADAS/AD system 1202 may be implemented, are omitted here for simplicity.

The sensors 1206 are here described as also including appropriate circuitry and/or executable programming for processing sensor output and performing a detection based on the processing. The sensors 1206 can include a RADAR 1210. In some implementations, the RADAR 1210 can include any object detection system that is based at least in part on radio waves. For example, the RADAR 1210 can be oriented in a forward direction relative to the vehicle and can be used for detecting at least a distance to one or more other objects (e.g., another vehicle). The RADAR 1210 can detect a traffic event by sensing the presence of an object in relation to the vehicle 1200.

The sensors 1206 can include a LIDAR 1212. In some implementations, the LIDAR 1212 can include any object detection system that is based at least in part on laser light. For example, the LIDAR 1212 can be oriented in any direction relative to the vehicle and can be used for detecting at least a distance to one or more other objects (e.g., another vehicle). The LIDAR 1212 can detect a traffic event by sensing the presence of an object in relation to the vehicle 1200.

The sensors 1206 can include a camera 1214. In some implementations, the camera 1214 can include any image sensor whose signal(s) the vehicle 1200 takes into account. For example, the camera 1214 can be oriented in any direction relative to the vehicle and can be used for detecting vehicles, lanes, lane markings, and/or road signage. The camera 1214 can detect a traffic event by visually registering a circumstance in relation to the vehicle 1200.

The sensors 1206 can include an ultrasonic sensor 1216. In some implementations, the ultrasonic sensor 1216 can include any transmitter, receiver, and/or transceiver used in detecting at least the proximity of an object based on ultrasound. For example, the ultrasonic sensor 1216 can be positioned at or near an outer surface of the vehicle. The ultrasonic sensor 1216 can detect a traffic event by sensing the presence of an object in relation to the vehicle 1200.

The sensors 1206 can include an accelerometer 1218. In some implementations, the accelerometer 1218 can include any device used in determining an acceleration of the device. For example, the accelerometer 1218 can be positioned at or near a front or rear bumper of the vehicle to detect an acceleration experienced by front or rear portion of the vehicle or can be positioned at other locations in the vehicle to detect an acceleration experienced at the other positions of the vehicle.

Any of the sensors 1206 alone, or two or more of the sensors 1206 collectively, can detect, while the ADAS/AD system 1202 is controlling motion of the vehicle 1200, a traffic event external to the vehicle 1200. In some implementations, at least one of the sensors 1206 can generate an output that is taken into account in detecting a traffic event. For example, the output of two or more sensors (e.g., the outputs of the RADAR 1210, the LIDAR 1212, and the camera 1214) can be combined to determine a distance between an ego vehicle and a target vehicle. In some implementations, one or more other types of sensors can additionally, or instead, be included in the sensors 1206. The traffic event can include a determination that the vehicle has a probability greater than a threshold value of experiencing a collision and an acceleration or deceleration as a result of the collision within a threshold time period in the near future from the time of the determination.

The planning algorithm 1208 can plan for the ADAS/AD system 1202 to perform one or more actions, or to not perform any action, in response to a detected traffic event. The output of one or more of the sensors 1206 can be taken into account. In some implementations, the planning algorithm 1208 can define a velocity reduction or a lateral offset change of the vehicle or of a change of a seat position of a seat in the vehicle.

The vehicle controls 1204 can include a steering control. In some implementations, the ADAS/AD system 1202 and/or another driver of the vehicle 1200 controls the trajectory of the vehicle 1200 by adjusting a steering angle of at least one wheel by way of manipulating the steering control. The steering control can be configured for controlling the steering angle though a mechanical connection between the steering control and the adjustable wheel, or can be part of a steer-by-wire system.

The vehicle controls 1204 can include brake controls 1224. In some implementations, the brake controls 1224 can control one or more types of braking systems designed to slow down the vehicle, stop the vehicle, and/or maintain the vehicle at a standstill when stopped. For example, the brake controls 1224 can be actuated by the ADAS/AD system 1202. As another example, the brake controls 1224 can be actuated by the driver using a brake pedal.

The vehicle controls 1204 can include an acceleration control 1228. In some implementations, the acceleration control 1228 can control one or more types of propulsion motor of the vehicle. For example, the acceleration control 1228 can control the electric motor(s) and/or the internal-combustion motor(s) of the vehicle 1200.

The vehicle controls 1204 can include a seat belt tensioner 1230. In some implementations, the seat belt tensioner 1230 can control the tension of a seat belt (e.g., increase and/or decrease the tension) for one or more seats of the vehicle

1200. For example, the seat belt tensioner 1230 can control the tension to apply an amount of pretension to the seat belt in the event of an impact, and/or to provide a physical feedback to the passenger upon detection of a traffic event.

The vehicle controls 1204 can include a seat motor 1232. In some implementations, the seat motor 1232 can control the lateral position (e.g., move the seat in a fore-aft direction) and/or configuration (e.g., adjust a seatback inclination) of one or more seats of the vehicle 1200. For example, the seat motor 1232 can control the position/inclination according to a user input (e.g., a comfort setting), and/or to control the position/inclination of one or more seats upon detection of a traffic event.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:
   a body structure defining an interior cabin;
   a multi-position seat within the interior cabin, the multi-position seat being fixedly attached to the body structure and including a seat cushion configured to support buttocks of an occupant of the multi-position seat from a lower side, a seatback configured to support a back of the occupant of the multi-position seat from a rear side, and a coupling between the seat cushion and the seatback, the coupling being configured to position the seatback in a first angular orientation relative to the seat cushion in an upright position and in a second angular orientation relative to the seat cushion in a reclined position;

one or more sensors configured for generating a determination that the vehicle is, or has a probability greater than a threshold value of, within a predetermined time period from the determination, decelerating at a rate greater than a threshold value;

a piston member coupled to a portion of the body structure located rearward of the seatback at a first end of the piston member when the multi-position seat is positioned in the reclined position and coupled to the seatback at a second end of the piston member, wherein the piston member is configured to, in response to the determination, automatically extend the second end away from the portion of the body structure, while the piston member remains coupled at the first end to the portion of the body structure and at the second end to the seatback, to cause the seatback to move from the reclined position to the upright position, wherein the piston member is not coupled to the seatback at the second end of the piston member when the multi-position seat is positioned in the upright position before the piston member is automatically extended.

2. The vehicle of claim 1, further comprising a gas source configured for supplying gas to the piston member in response to the determination to cause the piston member to extend away from the portion of the body structure to cause the seatback to move from the reclined position to the upright position in less than 50 ms.

3. The vehicle of claim 2, wherein the gas source includes an igniter configured to initiate a chemical reaction to generate the gas that is supplied to the piston member.

4. The vehicle of claim 1, wherein the threshold value is greater than or equal to 30 meters per second per second.

5. The vehicle of claim 1, wherein the one or more sensors include an accelerometer configured for determining the deceleration of the vehicle.

6. The vehicle of claim 1, wherein the one or more sensors include one or more electromagnetic radiation sensors configured for receiving electromagnetic radiation from outside the vehicle and a processor configured for receiving data from the one or more electromagnetic radiation sensors and generating the determination that the vehicle has a probability greater than the threshold value of, within a predetermined time period of less than ten seconds from the determination, decelerating at a rate greater than the threshold value.

7. The vehicle of claim 1, further comprising a gas source configured for supplying gas to the piston member in response to the determination to cause the piston member to extend away from the portion of the body structure to cause the seatback to move from the reclined position to the upright position in less than 50 ms.

8. The vehicle of claim 7, wherein the threshold value is greater than or equal to 30 meters per second per second.

9. The vehicle of claim 7, wherein the one or more sensors include an accelerometer configured for determining the deceleration of the vehicle.

10. The vehicle of claim 7, wherein the one or more sensors include one or more electromagnetic radiation sensors configured for receiving electromagnetic radiation from outside the vehicle and a processor configured for receiving data from the one or more electromagnetic radiation sensors and generating the determination that the vehicle has a probability greater than the threshold value of, within a predetermined time period of less than ten seconds from the determination, decelerating at a rate greater than the threshold value.

11. The vehicle of claim 7, further comprising a motor coupled to the piston member and configured to, in response to the generated determination, cause the second end of the piston member to automatically extend away from the portion of the body structure to cause the seatback to move from the reclined position toward the upright position.

12. The vehicle of claim 7, wherein the gas source includes an igniter configured to initiate a chemical reaction to generate the gas that is supplied to the piston member.

13. The vehicle of claim 12, wherein the one or more sensors include an accelerometer configured for determining the deceleration of the vehicle.

14. The vehicle of claim 12, wherein the one or more sensors include one or more electromagnetic radiation sensors configured for receiving electromagnetic radiation from outside the vehicle and a processor configured for receiving data from the one or more electromagnetic radiation sensors and generating the determination that the vehicle has a probability greater than the threshold value of, within a predetermined time period of less than ten seconds from the determination, decelerating at a rate greater than the threshold value.

15. The vehicle of claim 12, wherein the threshold value is greater than or equal to 30 meters per second per second.

16. The vehicle of claim 1, wherein the threshold value is greater than or equal to 30 meters per second per second.

17. The vehicle of claim 16, wherein the one or more sensors include an accelerometer configured for determining the deceleration of the vehicle.

18. The vehicle of claim 1, wherein the one or more sensors include an accelerometer configured for determining the deceleration of the vehicle.

19. The vehicle of claim 1, wherein the one or more sensors include one or more electromagnetic radiation sensors configured for receiving electromagnetic radiation from outside the vehicle and a processor configured for receiving data from the one or more electromagnetic radiation sensors and generating the determination that the vehicle has a probability greater than the threshold value of, within a predetermined time period of less than ten seconds from the determination, decelerating at a rate greater than the threshold value.

20. The vehicle of claim 19, further comprising a motor coupled to the piston member and configured to, in response to the generated determination, cause the second end of the piston member to automatically extend away from the portion of the body structure to cause the seatback to move from the reclined position toward the upright position.

* * * * *